(12) United States Patent
Neumann

(10) Patent No.: US 6,343,624 B2
(45) Date of Patent: Feb. 5, 2002

(54) SUPERINSULATION SUPPORT SYSTEM

(75) Inventor: Holger Neumann, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/829,055

(22) Filed: Apr. 9, 2001

Related U.S. Application Data

(63) Continuation-in-part of application No. PCT/EP99/06831, filed on Sep. 15, 1999.

(30) Foreign Application Priority Data

Oct. 9, 1998 (DE) ........................................ 198 46 587

(51) Int. Cl.[7] ................................................. F16L 9/10
(52) U.S. Cl. ..................... 138/149; 138/121; 138/112; 138/111; 138/148
(58) Field of Search ................. 138/149, 148, 138/111, 1, 114, 121, 122, 173

(56) References Cited

U.S. PATENT DOCUMENTS

| | | | | |
|---|---|---|---|---|
| 3,565,118 A | * | 2/1971 | Stearns | 138/112 |
| 3,595,275 A | * | 7/1971 | Stearns | 138/114 |
| 3,886,980 A | * | 6/1975 | Elson | 138/127 |
| 4,303,105 A | * | 12/1981 | Rohner | 138/149 |
| 4,492,089 A | * | 1/1985 | Rohner et al. | 62/55 |
| 4,570,678 A | * | 2/1986 | Ziemek et al. | 138/113 |
| 4,570,679 A | * | 2/1986 | Schippl | 138/149 |

OTHER PUBLICATIONS

Patent Abstracts of Japan, vol. 011, No. 182 E–515), Jun. 11, 1987 (1987–06–110 & JP62 015843 A (Fijitsu Ltd), Jan. 24, 1987 Summary.

H. Laeger, PH. Lebrun, P. Rohner: "Long flexible transfer lines for gaseous and liquid helium", Cryogenics, vol. 18, No. 12, Dec. 1978 (1978–12), pp. 659–662, XP002124084, Guildford, UK, Fig. 1, pp. 659–660, "Desiign of the lines".

Yamada S et al.: "Superconducting current feeder system for the large helical device", IEEE Transactions on Magnetics, US, IEEE INC. New York, vol. 32, No. 4, part 01, Jul. 1996, pp. 2422–2425, XP000598921, New York, US, ISSN: 0018–9464, Fig. 2.

* cited by examiner

*Primary Examiner*—Patrick Brinson
(74) *Attorney, Agent, or Firm*—Klaus J. Bach

(57) ABSTRACT

In a super-insulation support system disposed in an annular space between concentric inner and outer corrugated tubes, a number of axially spaced rings is provided, which are interconnected by axially extending rods mounted in circumferentially spaced relationship alternately to the inside and the outside of the axially spaced rings thereby forming a cylindrical frame structure, which is disposed adjacent the inner corrugated tube and super-insulation is disposed on the cylindrical frame structure and supported thereby at a distance from the corrugated inner tube.

4 Claims, 2 Drawing Sheets

SUPERINSULATION SUPPORT SYSTEM

This is a continuation-in-part application of international application PCT/EP99/06831 filed Sep. 15, 1999 and claiming the priority of German application 198 46 587.4 filed Oct. 10, 1998.

BACKGROUND OF THE INVENTION

The invention relates to a support system for super-insulation disposed in the annular space between concentrically arranged flexible corrugated tubes.

Such flexible corrugated tubes are used as transmission ducts for refrigerants such as liquid helium or liquid nitrogen. Another field of application relates to superconductors, which are cooled by helium, or high-temperature superconductors, which are cooled by nitrogen and are disposed in a flexible corrugated pipe.

For insulation, the corrugated tube to be insulated is wrapped with super-insulation, which is disposed in an evacuated annular gap between two corrugated tubes. In order to achieve the best possible insulation, a contact between the outer corrugated tube and the super-insulation by spacers should be avoided. From S. Yamada, T. Mits, H. Chikaraishi, S. Tanahashi, S. Kitagawa, J. Yamamoto, and O. Motojima; "Super-conducting Current Feeder System for the Large Helical Device", presented at MT-14, Tampere, Finland, Jun. 11–16, B72, a superconductor with a spacer structure is known which consists of four intertwined plastic hoses and which is wrapped around the super-insulation for centering the inner corrugated tube within the outer corrugated tube and to eliminate a contact between the superinsulation and the outer corrugated tube. It is however, a substantial disadvantage of this arrangement, that the thermal resistance of the super-insulation is substantially reduced by being subjected to the radial pressure load exerted by the spacer structure. In rigid tubes, the super-insulation between the inner and the outer tubes is disturbed by supports arranged only at relatively large distances from one another. The quality of the super-insulation is therefore not detrimentally affected by radial loads and the relatively large heat transfer at the support locations is not a large contributing factor for the heat flow per length unit because of the large distance between the support locations. In flexible tubes, however, the distances between the support locations are smaller because of possible bends in the tubes; they depend on the minimum bend radius of the tubes.

It is the object of the present invention to provide a support system for the insulation between concentric flexible tubes which provides for a high heat flow resistance.

SUMMARY OF THE INVENTION

In a super-insulation support system disposed in an annular space between concentric inner and outer corrugated tubes, a number of axially spaced rings is provided, which are interconnected by axially extending rods mounted in circumferentially spaced relationship alternately to the inside and the outside of the axially spaced rings thereby forming a cylindrical frame structure, which is disposed adjacent the inner corrugated tube and super-insulation is disposed on the cylindrical frame structure and supported thereby at a distance from the corrugated inner tube.

With the flexible tube support arrangement according to the invention, a separation of the isolation and the support system is achieved in the relatively small gaps necessary for the centering of the corrugated tube while maintaining the minimum bend radius. In this way, the heat transfer through the support system is only relatively small because only a relatively small number of heat transfer-relevant contact locations, small contact and cross-section areas and relatively large distances between the support locations at the inner and greater corrugated tubes are provided.

Below, an embodiment of the invention will be described in greater detail on the basis of the accompanying drawings.

DESCRIPTION OF A PREFERRED EMBODIMENT

Figure 1:
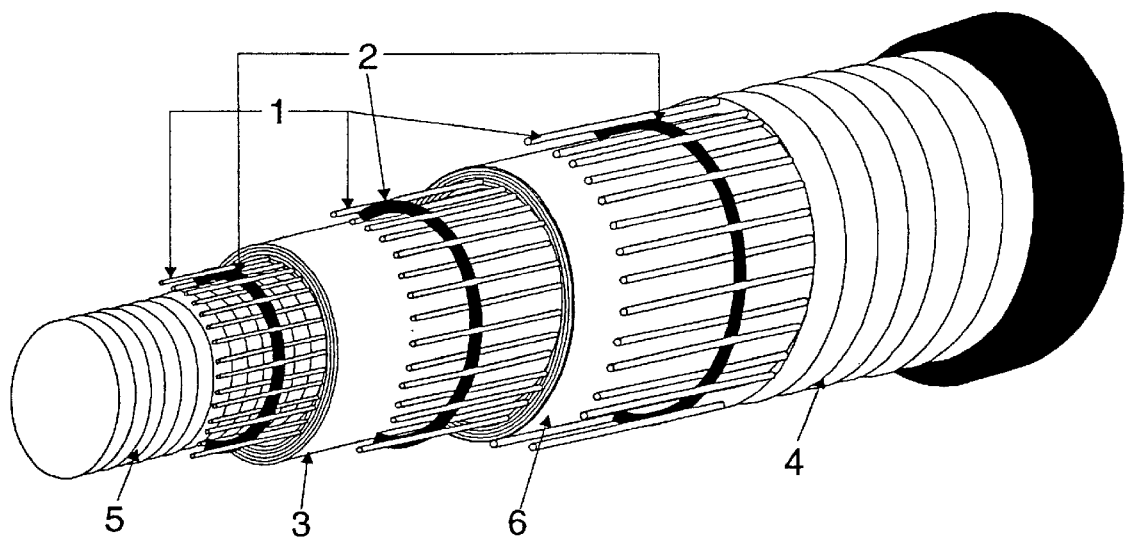
FIG. 1 is a perspective view of a tubular insulation arrangement, wherein a support system between two corrugated tubes is shown in stepped sections.

The super-insulation support system comprises essentially a plurality of axial rods which, distributed over the circumference of an inner corrugated tube, are connected alternately to the inside and the outside of axially spaced rings. In this way, cylindrical frames are formed, which are disposed concentrically in radially spaced relationship between the inner and the outer corrugated tubes 5 and 4. The two inner frames are wrapped between the respective support locations with super-insulation 3. For supporting the frames, some of the rods 1 disposed at the outer circumferences of the rings 2 of the adjacent inner frame are interconnected with some of the rods 1 disposed at the inner circumference of the respective outer frame. The locations of connection between the concentrically arranged cylindrical frames should be distributed uniformly over the circumference. The connection between the inner frame and the intermediate frame should be displaced in the longitudinal direction of the tube with respect to the connections between the intermediate frame and the outer frame. The distances between the supports depend essentially on the minimum radius of the bends and the radial loads for which the tube is designed. The support system is shown perspectively in FIG. 1. The various concentric layers of insulation and support frames are shown from the left to the right as they follow radially from the inside to the outside. At the far left, the inner corrugated tube 5 is shown. It is followed radially outwardly by a layer of rods 1. This layer of rods 1 is surrounded by another layer of rods 1, the rods of the two layers being alternately connected to the inside and the outside of the rings 2, so that a cylindrical frame is formed. On this frame, a first layer of super-insulation 3 is disposed. Then follows a second cylindrical frame, another layer of super-insulation 6 and a third cylindrical frame, on which the outer corrugated tube 4 is disposed. All the cylindrical frames are similar in design. Preferably, they are held in spaced relationship by connecting elements, which are not shown in FIG. 1.

Figure 2:
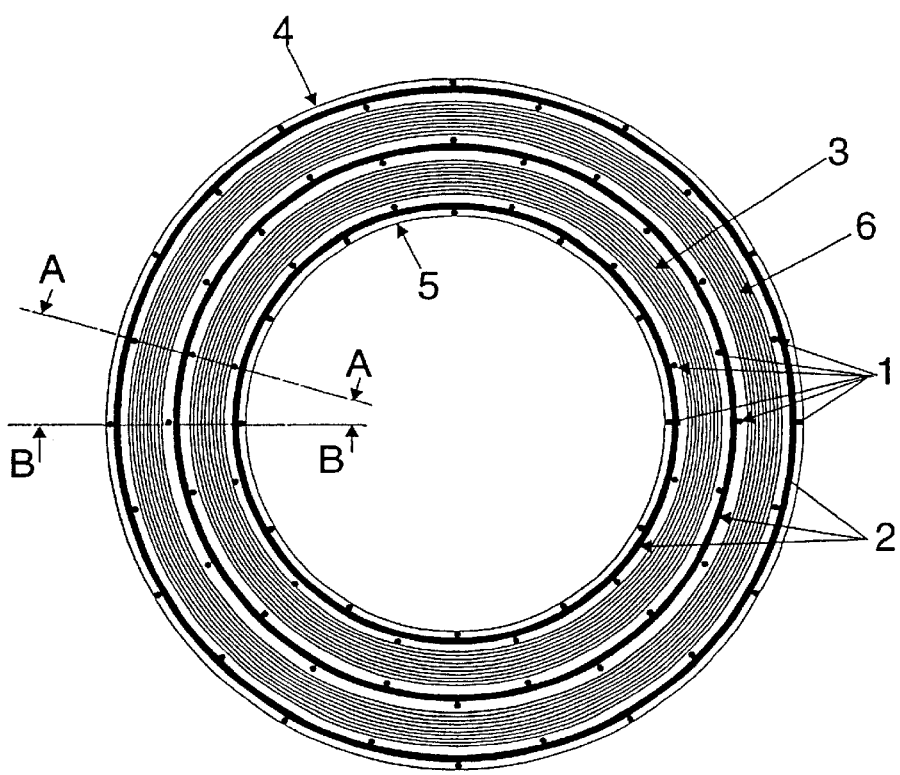
FIG. 2 is transverse cross-sectional view of the insulation arrangement between the corrugated tubes.

The arrangement is shown in FIG. 2 in a cross-sectional view taken in plane normal to the axis of the tubular support frame system as shown in FIG. 1. In this view, the axially extending rods 1 are shown as dots disposed alternately within and without the respective rings 2 to which they are attached.

Figure 3:
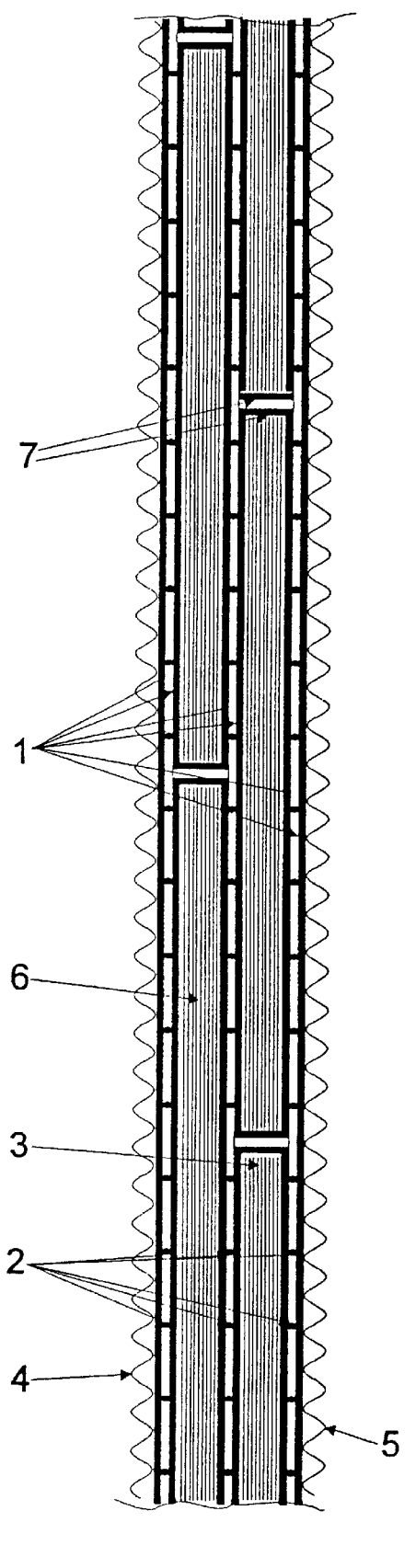
FIG. 3 is a longitudinal cross-sectional view of the insulator arrangement showing the support system between the corrugated tubes.

FIG. 2 is a longitudinal cross-sectional view of the support system as shown in FIG. 1. The symmetry axis is shown on the right as a dash-dotted line. The two sections A—A and B—B as indicated in FIG. 2 have been superimposed in FIG. 3 so that the rods 1 disposed above and below the rings 2 (shown here as dots) can be represented in the same figure. In this figure, also the connecting elements 7 are shown by which the three circular frames are interconnected to form a frame structure. The frames are arranged in spaced relationship in such a way that the connecting elements extending between the inner and intermediate frames are disposed about in the center areas between the connecting elements extending the intermediate and the outer frames.

The inner frame, which is in contact with the inner corrugated tube 5, provides for a space between the inner corrugated tube 5 and the first super-insulation foil 3. This results in the following advantages with respect to the insulation quality:

The heat transfer through a super-insulation 3 is composed of the components heat radiation, heat transfer through the residual gas and heat conduction through the solid structures such as the spacer structure between the individual super-insulation foils of a super-insulation layer 3, 6. Because of the non-linearity of the radiation a heat transfer, the respective temperature difference between two adjacent super-insulation foils increases with a lower temperature level. With an ideal installation of the insulation, the largest temperature difference exists therefore between the cold wall to be insulated and the first adjacent super insulation foil 3. This means that the heat transfer component resulting from radiation decreases with a lower temperature level, whereas the heat transfer component based on the insulation increases. Consequently, in the area of the largest temperature difference, that is in the area between the cold wall to be insulated and the first adjacent super-insulation foil, the thermal resistance to heat conduction should be particularly high. If the cold wall to be insulated would be in direct contact with the super-insulation 3 the thermal resistance to conduction would be relatively low, since the mechanical load would be high and the evacuation conditions would be the most adverse. With the arrangement according to the invention, the thermal resistance to heat transfer by heat conduction is increased in this critical area on one hand by the special design of the cylindrical frame structure, which limits the heat conducting contact points to the areas of contact between the rods 1 and the rings 2 and, on the other hand, by improving the evacuation conditions along the cold corrugated tube 5 to be insulated. With a direct wrapping of the cold wall to be insulated by the super-insulation 3 closed cells are formed between the corrugations of the corrugated tube 5 and the insulation, which cells are hard to evacuate. With the arrangement according to the invention, a space is formed between the corrugated tube and the first adjacent super-insulation foil, whereby the formation of such closed cells is avoided by the special design of the cylindrical frame structure. This results in improved evacuation conditions directly at the cold wall as an unrestricted flow space remains along the rods 1 for the evacuation of residual gases.

With the distance between the cold wall to be insulated and the first adjacent super-insulation layer and, at the same time, the minimizing of the heat conductive contact points, the super-insulation layer comes close to the ideal of a floating foil. The division of the super-insulation into two layer areas has the advantage that an optimum with respect to number of layers, layer density and also the number of layers for a certain insulation thickness can be obtained for both layer areas. A simple wrapping with the same number of foils results in a higher layer density—as established by experience—and therefore in a higher heat conductivity through the insulation layers. With the intermediate cylindrical frame structure, an intermediate support for the insulation is provided, whereby the density of the insulation layer is reduced and a vacuum space is provided. This facilitates the removal of residual gases out of the insulation layers 3, 6 and interrupts heat conduction through the super-insulation layer area.

The displacement of the spacer elements 7 between the inner and the intermediate and between the intermediate and the outer cylindrical frames has the advantage that a complete super insulation layer 3, 6 is also effective in these particular areas and the heat flow path along the frames and the spacers is increased.

What is claimed is:

1. A super-insulation support system disposed in an annular space between concentric inner and outer corrugated tubes, said support system comprising a number of axially spaced inner rings and axially extending rods mounted in circumferentially spaced relationship alternately to the inside and the outside of said rings, thereby forming a cylindrical inner frame which is disposed adjacent said inner corrugated tube and a super-insulation layer disposed around said cylindrical inner frame and supported thereby at a distance from said corrugated inner tube.

2. A super-insulation support system according to claim 1, wherein an outer cylindrical frame consisting of number of outer axially spaced rings interconnected by axially extending rods mounted in circumferentially spaced relationship alternately to the inside and the outside of said outer axially spaced rings is disposed between said outer corrugated tube and said super-insulation.

3. A super-insulation support system according to claim 2, wherein said super-insulation comprises two separate annular layer areas and an intermediate cylindrical frame consisting of a number of intermediate axially spaced rings interconnected by axially extending rods mounted in circumferentially spaced relationship alternately to the inside and the outside of said intermediate axially spaced rings is disposed between said two annular super-insulation layer areas so as to provide an annular space between said two super-insulation areas for separately supporting said two super-insulation areas and providing an evacuation space between said two super-insulation areas.

4. A super-insulation support system according to claim 3, wherein said inner, said outer and said intermediate cylindrical support frames are interconnected by spacer elements so as to be uniformly spaced from one another so that the super-insulation layer areas are protected from radial loads, said interconnected support frames forming a self-supporting flexible frame structure of high radial stability.

* * * * *